UNITED STATES PATENT OFFICE.

ARTHUR PARRY, OF PORT ORCHARD, WASHINGTON.

COMPOUND.

1,335,457.  Specification of Letters Patent.  Patented Mar. 30, 1920.

No Drawing. Application filed July 9, 1917, Serial No. 179,444. Renewed February 13, 1920. Serial No. 358,405.

*To all whom it may concern:*

Be it known that I, ARTHUR PARRY, a subject of the King of Great Britain, residing at Port Orchard, in the county of Kitsap and State of Washington, have invented certain new and useful Improvements in Compounds, of which the following is a specification.

This invention has relation to a method of planting young plants such as cabbage, cauliflower, or the like, whereby to prevent destruction of the roots by worms or insects.

Another object of the invention is to provide a compound to be used in connection with my method of planting.

In addition to the foregoing my invention comprehends the ingredients of a compound to be hereinafter described, their equivalents, and the proportions in which the ingredients occur in the compound within the spirit of the invention, and the scope of the appended claims.

As stated above the primary object of my invention is to prevent destruction of the roots of young cabbage, cauliflower and other plants when said plants are first entered into the soil, by worms or insects which infest the plants and which usually completely destroy the roots before the plants have hardly attained a degree of growth sufficient to enable the plants to resist the pests.

To this end, each plant prior to its entrance into the soil is dipped into a compound so as to entirely cover the roots and part of the foilage. For this purpose I employ as an essential ingredient lead oxid, and a filler of inert material. As filler yellow ocher, or any of the ochers, or earthy pigments may be used, and I prefer limonite. When mixing the ingredients, I prefer to employ a greater proportion by weight of filler, and a lesser proportion by weight of lead oxid. By a greater proportion, I mean approximately 75% more or less and by a lesser proportion, I mean 25% more or less. The mixture may be used dry. However, I prefer to mix the ingredients with a quantity of water sufficient to form a thick mixture in which the roots of the plants can be dipped. Any of the oxids of lead may be employed either separately or mixed, although I have found the red oxid to be satisfactory.

It has been my experience that plants treated in this manner will withstand the attacks of all worms and insects upon such parts of the plants that have been covered by the compound and furthermore the compound does not have any effect to devitalize the plant, or to interfere with its growth.

Having thus described my invention what I claim as new and desire to secure by Letters Patent is:—

1. A compound for the purpose described including twenty-five parts by weight of red lead, and seventy-five parts limonite.

2. A compound for the purpose described including red lead twenty-five parts by weight, limonite seventy-five parts, and water sufficient to make a thick mixture.

3. A compound for the purpose described including a greater proportion by weight of limonite and a lesser proportion by weight of red lead.

4. A compound for the purpose described including a greater proportion by weight of yellow ocher and a lesser proportion by weight of lead oxid.

In testimony whereof I affix my signature in presence of two witnesses.

ARTHUR PARRY.

Witnesses:
 W. W. BONER,
 R. H. MOYER.